United States Patent
Zhang et al.

(10) Patent No.: US 10,638,349 B2
(45) Date of Patent: Apr. 28, 2020

(54) CHANNEL SOUNDING INFORMATION FEEDBACK METHOD, USER EQUIPMENT, AND BASE STATION

(71) Applicant: HUAWEI TECHNOLOGIES CO., LTD., Shenzhen (CN)

(72) Inventors: Xu Zhang, Beijing (CN); Yan Cheng, Beijing (CN); Lixia Xue, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/022,723

(22) Filed: Jun. 29, 2018

(65) Prior Publication Data
US 2018/0310195 A1    Oct. 25, 2018

Related U.S. Application Data

(63) Continuation of application No. PCT/CN2016/105776, filed on Nov. 14, 2016.

(30) Foreign Application Priority Data

Dec. 31, 2015  (CN) .......................... 2015 1 1033853

(51) Int. Cl.
H04W 24/10    (2009.01)
H04L 5/00    (2006.01)
H04W 72/04    (2009.01)

(52) U.S. Cl.
CPC ........... H04W 24/10 (2013.01); H04L 5/0057 (2013.01); H04L 5/0007 (2013.01); H04W 72/042 (2013.01)

(58) Field of Classification Search
CPC .... H04L 5/0057; H04W 24/10; H04W 72/042
See application file for complete search history.

(56) References Cited

U.S. PATENT DOCUMENTS

2012/0082124 A1*  4/2012  Kwon ................... H04L 5/0007
                                                            370/329
2012/0281654 A1* 11/2012  Aiba ...................... H04L 5/0007
                                                            370/329
2013/0170466 A1    7/2013  Nishio et al.
2013/0188591 A1    7/2013  Ko et al.
(Continued)

FOREIGN PATENT DOCUMENTS

CN    102340816 A    2/2012
CN    102412941 A    4/2012
(Continued)

*Primary Examiner* — Ayaz R Sheikh
*Assistant Examiner* — Debebe A Asefa
(74) *Attorney, Agent, or Firm* — Kilpatrick Townsend & Stockton LLP

(57) ABSTRACT

The present disclosure discloses a channel sounding information feedback method, user equipment, and a base station. The method includes: determining, by UE, a first period used to periodically report channel sounding information; and periodically sending, by the UE based on received preset downlink control information DCI that is sent by a base station, the channel sounding information by using the first period as a sending period. System overheads can be reduced, a configuration response can be improved, and spectrum utilization of a system can be improved while periodic feedback of indication is reduced.

17 Claims, 5 Drawing Sheets

(56) References Cited

U.S. PATENT DOCUMENTS

2013/0286904 A1    10/2013   Xu et al.
2015/0085786 A1    3/2015   Lu et al.
2015/0195070 A1    7/2015   Kim et al.
2016/0029238 A1    1/2016   Chen et al.

FOREIGN PATENT DOCUMENTS

| | | |
|---|---|---|
| CN | 102595476 A | 7/2012 |
| CN | 102595596 A | 7/2012 |
| EP | 2485553 A1 | 8/2012 |
| EP | 2634939 A2 | 9/2013 |
| JP | 2011211323 A | 10/2011 |
| WO | 2013162439 A2 | 10/2013 |
| WO | 2013177758 A1 | 12/2013 |
| WO | 2014135100 A1 | 9/2014 |

\* cited by examiner

CHANNEL SOUNDING INFORMATION FEEDBACK METHOD, USER EQUIPMENT, AND BASE STATION

CROSS-REFERENCE TO RELATED APPLICATIONS

This application is a continuation of International Application No. PCT/CN2016/105776, filed on Nov. 14, 2016, which claims priority to Chinese Patent Application No. 201511033853.6, filed on Dec. 31, 2015. The disclosures of the aforementioned applications are hereby incorporated by reference in their entireties.

TECHNICAL FIELD

The present disclosure relates to the field of communications technologies, and in particular, to a channel sounding information feedback method, user equipment, and a base station.

BACKGROUND

In a Long Term Evolution (LTE) communications system, channel sounding information is obtained by user equipment (UE) by sounding a downlink transmission channel and quantizing a sounding result and is reported by the user equipment to a base station, so that the base station can obtain an interference status of downlink transmission.

The channel sounding information includes a channel quality indicator (CQI) and a channel sounding reference signal (SRS). UE sounds a downlink transmission channel to obtain a CQI, and feeds back the CQI to a base station on an uplink channel. The base station determines a modulation and coding scheme of the UE based on the fed back CQI. In addition, the base station estimates channel state information of a downlink channel by using an uplink SRS and reciprocity between the uplink channel and the downlink channel, to obtain a channel matrix of a multi-transceiver-unit system. Based on the channel matrix, co-frequency and co-time transmission of a plurality of UEs can be implemented on the base station by using a precoding technology, thereby improving spectrum utilization of the system.

In a current standard, feedback of a CQI and an SRS includes two types: periodic feedback and aperiodic feedback.

For periodic CQI feedback, a CQI is carried by using a physical uplink control channel (PUCCH), and a time interval of the feedback is implemented through semi-static configuration by using higher layer Radio Resource Control (RRC) signaling. For aperiodic CQI feedback, a CQI is carried by using a physical uplink shared channel (PUSCH). The feedback is triggered by receiving downlink control information (DCI). Each time the UE is triggered, the UE feeds back all sounded CQIs at a time by using the PUSCH. Frequency of periodic feedback of an SRS is configured by using higher layer RRC. Aperiodic feedback of an SRS is triggered by receiving DCI. After each trigger, the UE transmits the SRS only once on the last symbol of a configured subframe.

In a future evolved cellular network system, a very high requirement is imposed on channel sounding information obtained by a base station. That is, sounding frequency of the channel sounding information needs to be increased. Therefore, a feedback interval of a CQI or an SRS needs to be shortened. However, dynamically changing feedback frequency by increasing a quantity of times of aperiodic feedback or by using RRC configuration leads to problems that overheads are increased and a configuration response is not timely, and consequently, overall spectrum utilization of the system is affected.

SUMMARY

The present disclosure provides a channel sounding information feedback method, user equipment, and a base station, to reduce system overheads, improve a configuration response, and improve spectrum utilization of a system while periodic feedback of indication is reduced.

According to a first aspect, a channel sounding information feedback method is provided, including: determining, by user equipment UE, a first period used to periodically report channel sounding information; and periodically sending, by the UE based on received preset downlink control information DCI that is sent by a base station, the channel sounding information by using the first period as a sending period.

With reference to the first aspect, in a first possible implementation of the first aspect, the method further includes: determining, by the UE, a second period used to periodically report channel sounding information; and the periodically sending, by the UE, the channel sounding information by using the first period as a sending period includes: periodically sending, by the UE, the channel sounding information by using the first period and/or the second period as a sending period.

With reference to the first possible implementation of the first aspect, in a second possible implementation of the first aspect, before the UE receives the preset downlink control information DCI that is sent by the base station, the method further includes: periodically sending, by the UE, the channel sounding information by using the first period as a sending period; and the periodically sending, by the UE, the channel sounding information by using the second period as a sending period includes: switching, by the UE, to periodically send the channel sounding information by using the second period as a sending period.

With reference to the second possible implementation of the first aspect, in a third possible implementation of the first aspect, a priority of the channel sounding information sent by using the second period is greater than a priority of the channel sounding information sent by using the first period; and the switching, by the UE, to periodically send the channel sounding information by using the second period as a sending period includes: if the UE needs to send the channel sounding information by using the first period and the second period as a sending period separately at a same moment, switching, by the UE to send the channel sounding information corresponding to the second period at the moment by using the second period as a sending period.

With reference to the first possible implementation of the first aspect, in a fourth possible implementation of the first aspect, before the UE receives the DCI that is sent by the base station, the method further includes: configuring, by the UE, a first timer associated with the first period and/or a timer associated with the second period.

With reference to the fourth possible implementation of the first aspect, in a fifth possible implementation of the first aspect, the periodically sending, by the UE, the channel sounding information by using the second period as a sending period includes: starting, by the UE, the second timer; and when the second timer expires, stopping, by the UE, periodically sending the channel sounding information by using the second period as a sending period, and restoring to periodically send the channel sounding information by using the first period as a sending period.

With reference to the fourth possible implementation of the first aspect, in a sixth possible implementation of the first aspect, the periodically sending, by the UE, the channel sounding information by using the first period as a sending period includes: starting, by the UE, the first timer; and when the first timer expires, stopping, by the UE, periodically sending the channel sounding information by using the first period as a sending period.

With reference to the first possible implementation of the first aspect, in a seventh possible implementation of the first aspect, the periodically sending, by the UE, the channel sounding information by using the first period and/or the second period as a sending period includes: determining, by the UE, indication information in the received preset DCI, where the indication information is used to indicate the first period and/or the second period; and when the indication information is information used to start the first period and/or the second period, periodically sending, by the UE, the channel sounding information by using the first period and/or the second period as a sending period.

With reference to the seventh possible implementation of the first aspect, in an eighth possible implementation of the first aspect, the method further includes: when the indication information is used to disable feedback of the channel sounding information, and the UE uses the second period as a sending period, restoring, by the UE, to periodically send the channel sounding information by using the first period as a sending period.

With reference to the seventh possible implementation of the first aspect, in a ninth possible implementation of the first aspect, the method further includes: when the indication information is used to disable feedback of the channel sounding information, and the UE uses the first period as a sending period, stopping, by the UE, sending the channel sounding information by using the first period as a sending period.

With reference to any one of the seventh possible implementation of the first aspect to the ninth possible implementation of the first aspect, in a tenth possible implementation of the first aspect, the indication information is carried by using a field in the preset DCI; and the field in the preset DCI includes at least one of the following: a downlink assignment index DAI field of the DCI; a resource block assignment Resource block assignment field in DCI format Format 1A control signaling; and a CSI request field and an SRS request field in a DCI format 0 and/or the DCI format 4.

With reference to any one of the seventh possible implementation of the first aspect to the ninth possible implementation of the first aspect, in an eleventh possible implementation of the first aspect, the determining, by the UE, indication information in the received preset DCI includes: if the preset DCI is the resource block assignment field in the DCI format 1A control signaling, and a value in the resource block assignment field is a specified value, obtaining designated location information in a modulation and coding scheme MCS field in the DCI format 1A control signaling; and using the designated location information as the indication information.

With reference to the tenth possible implementation of the first aspect, in a twelfth possible implementation of the first aspect, the periodically sending, by the UE, the channel sounding information by using the first period and/or the second period as a sending period includes: if the preset DCI is the CSI request field and the SRS request field in the DCI format 0 and/or the DCI format 4, triggering, by the UE, aperiodic channel sounding information once; and after sending the aperiodic channel sounding information, periodically sending, by the UE, the channel sounding information by using the first period and/or the second period as a sending period.

With reference to any one of the first aspect to the twelfth possible implementation of the first aspect, in a thirteenth possible implementation of the first aspect, the channel sounding information includes a channel sounding information indicator CQI and/or a channel sounding reference signal SRS.

According to a second aspect, a channel sounding information feedback method is provided, including: sending, by a base station, preset downlink control information DCI to user equipment UE; and receiving, by the base station, channel sounding information sent by the UE, where the channel sounding information is periodically sent by the UE by using a first period and/or a second period as a sending period, and the first period and the second period are a sending period used by the UE to send the channel sounding information.

With reference to the second aspect, in a first possible implementation of the second aspect, the sending, by a base station, preset DCI to UE includes: sending, by the base station, the preset DCI to the UE, where the preset DCI includes indication information, and the indication information is used to indicate the first period and/or the second period.

With reference to the first possible implementation of the second aspect, in a second possible implementation of the second aspect, the indication information includes one of the following: information used to start the first period and/or the at least one second period; and information used to end the first period and/or the at least one second period.

With reference to the first or the second possible implementation of the second aspect, in a third possible implementation of the second aspect, the preset DCI includes a downlink assignment index DAI field of the DCI; and the sending, by the base station, the preset DCI to the UE includes: sending, by the base station, the preset DCI to the UE, where when the DAI field of the DCI does not carry a bundled feedback acknowledgement/negative acknowledgement ACK/NACK, the base station sets the DAI field to carry the indication information used to indicate feedback of the channel sounding information.

With reference to the first or the second possible implementation of the second aspect, in a fourth possible implementation of the second aspect, the preset DCI includes a resource block assignment Resource block assignment field in the DCI format Format 1A control signaling; and the sending, by the base station, the preset DCI to the UE includes: setting, by the base station, a value in the resource block assignment field in the DCI format 1A control signaling to a specified value; setting, by the base station, designated bit information in a modulation and coding scheme MCS field in the DCI format 1A control signaling, where the specified value and the designated bit information are used to indicate the indication information for indicating the first period and/or the second period; and sending, by the base station, the DCI format 1A control signaling carrying the indication information to the UE.

With reference to the first or the second possible implementation of the second aspect, in a fifth possible implementation of the second aspect, the preset DCI includes a CSI request field and an SRS request field in a DCI Format 0 and/or the DCI format 4; and the sending, by the base station, the preset DCI to the UE includes: setting, by the base station, the CSI request field and the SRS request field in the DCI format 0 and/or the DCI format 4 control signaling to a specified value, where the specified value is the indication information for indicating the first period and/or the second period; and sending, by the base station, the DCI format 0 and/or DCI format 4 control signaling carrying the indication information to the UE.

With reference to any one of the second aspect to the fifth possible implementation of the second aspect, in a sixth possible implementation of the second aspect, the channel sounding information includes a channel sounding information indicator CQI and/or a channel sounding reference signal SRS.

According to a third aspect, user equipment is provided, including: a processing unit, configured to determine a first period used to periodically report channel sounding information; and a transceiver unit, configured to receive preset downlink control information DCI that is sent by a base station, where the processing unit is further configured to periodically send, by using the transceiver unit and based on the received preset downlink control information DCI that is sent by the base station, the channel sounding information by using the first period as a sending period.

With reference to the third aspect, in a first possible implementation of the third aspect, the processing unit is further configured to: determine a second period used to periodically report channel sounding information; and periodically send, by using the transceiver unit, the channel sounding information by using the first period and/or the second period as a sending period.

With reference to the first possible implementation of the third aspect, in a second possible implementation of the third aspect, the processing unit is further configured to: before the preset DCI is received, periodically send, by using the transceiver unit, the channel sounding information by using the first period as a sending period; and after the preset DCI is received, switch to periodically send the channel sounding information by using the second period as a sending period.

With reference to the second possible implementation of the third aspect, in a third possible implementation of the third aspect, a priority of the channel sounding information sent by using the second period is greater than a priority of the channel sounding information sent by using the first period; and the processing unit is specifically configured to: if the UE needs to send the channel sounding information by using the first period and the second period as a sending period separately at a same moment, switch, by the UE, to send, by using the transceiver unit, the channel sounding information corresponding to the second period at the moment by using the second period as a sending period.

With reference to the first possible implementation of the third aspect, in a fourth possible implementation of the third aspect, the processing unit is further configured to configure a first timer associated with the first period and/or a timer associated with the second period.

With reference to the fourth possible implementation of the third aspect, in a fifth possible implementation of the third aspect, the processing unit is specifically configured to: start the second timer; and when the second timer expires, stop periodically sending the channel sounding information by using the second period as a sending period, and restore to periodically send the channel sounding information by using the first period as a sending period.

With reference to the fourth possible implementation of the third aspect, in a sixth possible implementation of the third aspect, the processing unit is specifically configured to: start the first timer; and when the first timer expires, stop periodically sending the channel sounding information by using the first period as a sending period.

With reference to the first possible implementation of the third aspect, in a seventh possible implementation of the third aspect, the processing unit is specifically configured to: determine indication information in the received preset DCI, where the indication information is used to indicate the first period and/or the second period; and when the indication information is information used to start the first period and/or the second period, periodically send, by using the transceiver unit, the channel sounding information by using the first period and/or the second period as a sending period.

With reference to the seventh possible implementation of the third aspect, in an eighth possible implementation of the third aspect, the user equipment further includes: the processing unit is specifically configured to: when the indication information is used to disable feedback of the channel sounding information, and the UE uses the second period as a sending period, restore to periodically send, by using the transceiver unit, the channel sounding information by using the first period as a sending period.

With reference to the seventh possible implementation of the third aspect, in a ninth possible implementation of the third aspect, the processing unit is further configured to: when the indication information is used to disable feedback of the channel sounding information, and the UE uses the first period as a sending period, stop sending the channel sounding information by using the first period as a sending period.

With reference to any one of the third aspect to the ninth possible implementation of the third aspect, in a tenth possible implementation of the third aspect, the indication information is carried by using a field in the preset DCI; and the field in the preset DCI received by the transceiver unit includes at least one of the following: a downlink assignment index DAI field of the DCI, a resource block assignment Resource block assignment field in the DCI format Format 1A control signaling, and a CSI request field and an SRS request field in the DCI format 0 and/or the DCI format 4.

With reference to any one of the seventh possible implementation of the third aspect to the ninth possible implementation of the third aspect, in an eleventh possible implementation of the third aspect, the processing unit is specifically configured to: if the preset DCI is a resource block assignment field in the DCI format 1A control signaling, and a value in the resource block assignment field is a specified value, obtain designated location information in a modulation and coding scheme MCS field in the DCI format 1A control signaling; and use the designated location information as the indication information.

With reference to the tenth possible implementation of the third aspect, in a twelfth possible implementation of the third aspect, the processing unit is specifically configured to: if the preset DCI is the CSI request field and the SRS request field in the DCI format 0 and/or the DCI format 4, trigger, by the UE, aperiodic channel sounding information once; and after the aperiodic channel sounding information is sent, periodically send, by the UE, the channel sounding information by using the first period and/or the second period as a sending period.

With reference to any one of the third aspect to the twelfth possible implementation of the third aspect, in a thirteenth possible implementation of the third aspect, the channel sounding information sent by the processing unit by using the transceiver unit includes a channel sounding information indicator CQI and/or a channel sounding reference signal SRS.

According to a fourth aspect, a base station is provided, including a processing unit and a transceiver unit. The processing unit is configured to: preset downlink control information DCI; send the preset downlink control information DCI to user equipment UE by using the transceiver unit; and receive channel sounding information sent by the UE, where the channel sounding information is periodically sent by the UE by using a first period and/or a second period as a sending period, and the first period and the second period are a sending period used by the UE to send the channel sounding information.

With reference to the fourth aspect, in a first possible implementation of the fourth aspect, the processing unit is specifically configured to send the preset DCI to the UE by using the transceiver unit, where the preset DCI includes indication information, and the indication information is used to indicate the first period and/or the second period.

With reference to the first possible implementation of the fourth aspect, in a second possible implementation of the fourth aspect, the indication information sent by the transceiver unit includes one of the following: information used to start the first period and/or the at least one second period; and information used to end the first period and/or the at least one second period.

With reference to the first or the second possible implementation of the fourth aspect, in a third possible implementation of the fourth aspect, the preset DCI includes a downlink assignment index DAI field of the DCI; and the processing unit is specifically configured to: send the preset DCI to the UE, where when the DAI field of the DCI does not carry a bundled feedback acknowledgement/negative acknowledgement ACK/NACK, the base station sets the DAI field to carry the indication information used to indicate the feedback of the channel sounding information.

With reference to the first or the second possible implementation of the fourth aspect, in a fourth possible implementation of the fourth aspect, the preset DCI includes a resource block assignment Resource block assignment field in the DCI format Format 1A control signaling; and the processing unit is specifically configured to: set a value in the resource block assignment field in the DCI format 1A control signaling to a specified value; set designated bit information in a modulation and coding scheme MCS field in the DCI format 1A control signaling, where the specified value and the designated bit information are used to indicate the indication information for indicating the first period and/or the second period; and send the DCI format 1A control signaling carrying the indication information to the UE.

With reference to the first or the second possible implementation of the fourth aspect, in a fifth possible implementation of the fourth aspect, the preset DCI includes a CSI request field and an SRS request field in a DCI format 0 and/or the DCI format 4; and the processing unit is specifically configured to: set the CSI request field and the SRS request field in the DCI format 0 and/or the DCI format 4 control signaling to a specified value, where the specified value is the indication information for indicating the first period and/or the second period; and send the DCI format 0 and/or DCI format 4 control signaling carrying the indication information to the UE.

With reference to any one of the fourth aspect to the fifth possible implementation of the fourth aspect, in a sixth possible implementation of the fourth aspect, the channel sounding information received by the transceiver unit includes a channel sounding information indicator CQI and/or a channel sounding reference signal SRS.

According to a fifth aspect, user equipment is provided, including a transceiver and a processor. The transceiver may implement functions of the foregoing transceiver unit, and the transceiver includes an interface. The processor may implement functions of the foregoing processing unit. Details are not described again.

The user equipment may further include a memory, configured to store data and program code. The processor may obtain the program code from the memory, and perform a corresponding procedure based on the obtained program code.

According to a sixth aspect, a base station is provided, including a transceiver and a processor. The transceiver may implement functions of the foregoing transceiver unit, and the transceiver includes an interface. The processor may implement functions of the foregoing transceiver unit. Details are not described again.

The base station may further include a memory, configured to store data and program code. The processor may obtain the program code from the memory, and perform a corresponding procedure based on the obtained program code.

According to the foregoing technical solutions, on a terminal side, the UE determines the first period used to periodically report the channel sounding information, and the UE periodically sends, based on the received preset DCI that is sent by the base station, the channel sounding information by using the first period as a sending period. On a base station side, the base station sends the preset DCI to the user equipment UE, and the base station receives the channel sounding information sent by the UE. System overheads can be reduced, a configuration response can be improved, and spectrum utilization of a system can be improved while periodic feedback of indication is reduced.

DESCRIPTION OF EMBODIMENTS

Figure 1:
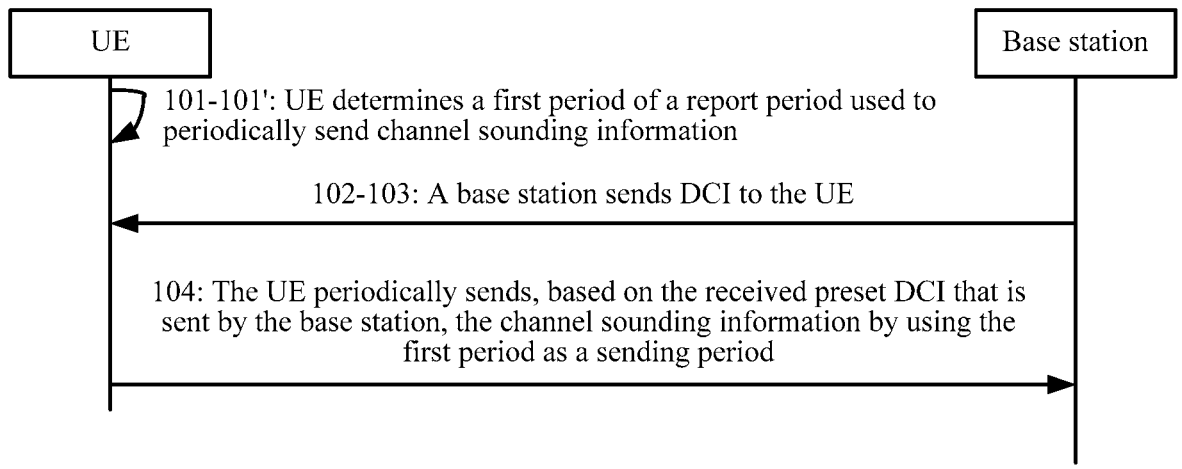
FIG. 1 is a flowchart of a channel sounding information feedback method according to Embodiment 1 of the present disclosure.

The technical solutions of the present disclosure may be applicable to various communications systems, such as a GSM system, a Code Division Multiple Access (CDMA) system, a Wideband Code Division Multiple Access (WCDMA) system, a general packet radio service (GPRS) system, and a Long Term Evolution (LTE) system.

User equipment (UE), also referred to as a mobile terminal, mobile user equipment, and the like, may communicate with one or more core networks through a radio access network (RAN) and the like. The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus, which exchanges languages and/or data with the radio access network.

A base station may be a base transceiver station (BTS) in the GSM or CDMA, may be a NodeB in the WCDMA, or may be an evolved NodeB (eNB or e-NodeB) in LTE. This is not limited in the present disclosure.

Channel sounding information is obtained by UE by sounding an uplink transmission channel and quantizing a sounding result and is reported by the UE to a base station. The channel sounding information includes a CQI and/or an SRS. Feedback of the channel sounding information includes two types: periodic feedback and aperiodic feedback. In an LTE standard, setting of a parameter of a sending period of periodic feedback is stipulated. Subsequently, the UE periodically sends the channel sounding information to the base station based on the sending period.

In the technical solutions provided in the embodiments of the present disclosure, the sending period is dynamically controlled by using physical layer signaling. First, a plurality of sending periods, for example, a first period and a second period, are configured through configuration on an RRC layer. Next, physical-layer downlink transmission control signaling in an LTE communications system is defined, and the defined downlink transmission control signaling is sent to the UE, so as to instruct the UE to dynamically switch a sending period of the channel sounding information. In the technical solutions provided in the embodiments of the present disclosure, the parameter of the sending period stipulated in the standard is set to the first period. In addition to the first period, in the technical solutions provided in the embodiments of the present disclosure, at least one second period is introduced. The sending period of reporting the channel sounding information by the UE is modified by using the at least one second period. One first period and one second period are used as an example for detailed description.

Main implementation principles and specific implementations of the technical solutions of the embodiments of the present disclosure, and corresponding beneficial effects that can be achieved thereby are described below in detail with reference to the accompanying drawings.

Embodiment 1

Embodiment 1 of the present disclosure provides a channel sounding information feedback method. As shown in FIG. 1, a specific processing procedure is as follows:

101: UE determines a first period of a report period used to periodically send channel sounding information.

Figure 2:
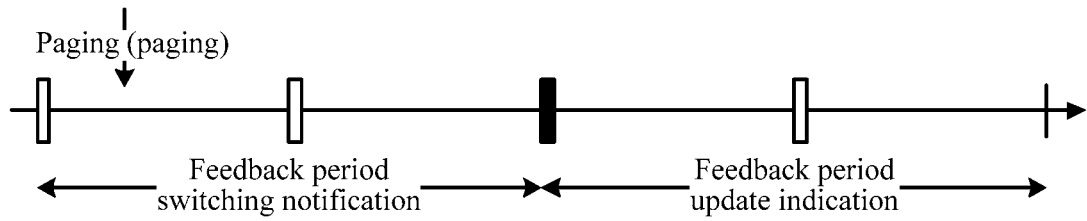
FIG. 2 is a schematic diagram of a configuration time sequence by using higher layer RRC signaling according to Embodiment 1 of the present disclosure.

In 101, the UE receives system information of a serving cell, and configures the first period of the report period of the channel sounding information based on the received system information. A length and a validity time (the validity time may be configured by using a timing time of a timer) of the first period may be configured by using RRC signaling. In a schematic diagram of a configuration time sequence shown in FIG. 2, a specific procedure of configuring the first period is: The UE receives RRC signaling that is sent by a base station in an LTE communications system. The UE obtains a configuration in the RRC signaling by receiving RRC connection setup. After obtaining the configuration in the RRC signaling, the UE determines the first period. The RRC signaling may be periodically changed or may be changed in a paging-triggered manner. For each change, a change notification needs to be sent in a first modification period, and then the RRC configuration is updated in a next period close to the first modification period.

In the LTE communications system, when the channel sounding information is a CQI, and when the UE determines a first period of the CQI, the UE configures the first period by receiving higher layer information, that is, RRC connection setup and RRC connection reconfiguration. The higher layer information received by the UE includes CQI-report config content, and a CQI-reportperiodic.cqi-pmi-configindex field is used to indicate the first period of the CQI. Specifically, using an FDD communications system as an example, the first period is obtained by using the following Table 1, that is, a CQI periodic feedback configuration table. The UE queries Table 1, and feeds back the CQI to the base station on a subframe satisfying the following formula 1:

$$(10 \times n_f + \lfloor n_s/2 \rfloor - N_{OFFSET,CQI}) \bmod N_{pd} = 0 \qquad \text{formula 1}$$

In the formula 1, $n_f$ is used to represent a number of a radio frame, and $n_s$ represents a number of a timeslot in the radio frame. A feedback parameter of the first period becomes valid in a radio frame in which this message is received.

TABLE 1

| cqi-pmi-ConfigIndex $I_{CQI/PMI}$ | CQI Periodicity $N_{pd}$ | Subframe Offset $N_{OFFSET}$ |
|---|---|---|
| 0-1 | 2 | $I_{CQI/PMI}$ |
| 2-6 | 5 | $I_{CQI/PMI}-2$ |
| 7-16 | 10 | $I_{CQI/PMI}-7$ |
| 17-36 | 20 | $I_{CQI/PMI}-17$ |
| 37-76 | 40 | $I_{CQI/PMI}-37$ |
| 77-156 | 80 | $I_{CQI/PMI}-77$ |
| 157-316 | 160 | $I_{CQI/PMI}-157$ |
| $I_{CQI/PMI}=317$ | | Reserved |
| 318-349 | 32 | $I_{CQI/PMI}-318$ |
| 350-413 | 64 | $I_{CQI/PMI}-350$ |
| 414-541 | 128 | $I_{CQI/PMI}-414$ |
| 542-1023 | | Reserved |

In the LTE communications system, when the channel sounding information is an SRS, and when the UE determines a first period of the SRS, the UE configures the first period by receiving SIB2, RRC connection setup and RRC connection reconfiguration that are sent by the base station. Higher layer information received by the UE includes soundingRS-UL-configdedicated, and a srs-configinde field indicates the first period of reporting the SRS. Specifically, using an FDD system as an example, the first period of the SRS is obtained by using the following Table 2. The UE queries Table 2, and selects a subframe satisfying the following formula 2 to send the SRS:

$$(10 \cdot n_f \cdot k_{SRS} - T_{offset}) \bmod T_{SRS} = 0 \qquad \text{formula 2}$$

In the formula 2, $n_f$ is used to represent a number of a radio frame, and $k_{SRS} = \{0, 1, \ldots, 9\}$. A parameter of the first period becomes valid in a radio frame in which this message is received.

TABLE 2

| srs-ConfigInde $I_{SRS}$ | SRS Periodicity (ms) $T_{SRS}$ | Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

Optionally, the method further includes the following steps:

101': The UE determines a second period of the report period used to periodically send the channel sounding information.

In the technical solution provided in Embodiment 1 of the present disclosure, when determining the report period used to periodically send the channel sounding information, the UE may determine the second period.

Configuration information of the second period may include, but is not limited to, indication information used to indicate the first period, or may include configuration information of the first period.

The configuration information of the second period includes at least one of the following information:

first: the configuration information of the second period includes information used to indicate a difference between the second period and the first period;

second: the configuration information of the second period includes same information as that of the first period; and third: in the configuration information of the second period, at least one digit may be reserved, and the at least one digit is used to indicate a case in which the sending period is null.

When the sending period is null, it indicates that the period does not exist.

102: A base station sends preset DCI to the UE.

The base station sends the preset DCI to the UE, to trigger the UE to aperiodically report the channel sounding information.

103: The UE receives the preset DCI sent by the base station.

104: The UE periodically sends, based on the received preset DCI that is sent by the base station, the channel sounding information by using the first period as a sending period.

In the embodiments 101 to 104, the UE periodically sends, based on the received preset DCI that is sent by the base station, the channel sounding information by using the first period as a sending period. The UE is triggered by the preset DCI, to periodically send the channel sounding information by using the first period as a sending period.

Correspondingly, after periodically sending the channel sounding information by using the first period as a sending period, the UE may further stop periodically sending the channel sounding information by using the first period as a sending period. A specific implementation is as follows:

A first implementation: The UE may be triggered based on the received preset DCI, to stop periodically sending the channel sounding information by using the first period as a sending period. Specifically, the base station may preset the DCI for implementation.

In the first implementation, the UE determines indication information in the received preset DCI. When the indication information is information used to start the first period, the UE periodically sends the channel sounding information by using the first period as a sending period. When the indication information is information used to end the first period, the UE stops periodically sending the channel sounding information by using the first period as a sending period.

A second implementation: A first timer associated with the first period is set for implementation.

In the second implementation, when periodically sending the channel sounding information by using the first period as a sending period, the UE simultaneously starts the first timer associated with the first period. When the first timer expires, the UE stops periodically sending the channel sounding information by using the first period as a sending period.

In the embodiments 101 to 104, the UE periodically sends the channel sounding information by using the first period as a sending period. Further, in 101', the UE determines the second period, and then in 104, during specific implementation, the UE periodically sends the channel sounding information by using the first period and/or the second period as a sending period. That is, if the UE has determined the first period and the second period, when receiving the preset DCI, the UE may periodically send the channel sounding information by using the first period as a sending period; or may periodically send the channel sounding information by using the second period as a sending period. Further, the UE may periodically send the channel sounding information by using the first period and the second period as a sending period simultaneously.

Optionally, before 103, the method may further include:

periodically sending, by the UE, the channel sounding information by using the first period as a sending period, and when the UE receives the preset DCI, switching, by the UE, to periodically send the channel sounding information by using the second period as a sending period.

In this manner, when the UE does not receive the preset DCI that is sent by the base station, the UE sends the channel sounding information by using the first period as a sending period. When the UE receives the preset DCI that is sent by the base station, the UE switches to periodically send the channel sounding information by using the second period as a sending period. That is, the preset DCI received by the UE is an implementation of ending the first period and triggering to start the second period.

Further, the channel sounding information sent by using the second period differs from the channel sounding information sent by using the first period, and a priority of the channel sounding information sent by using the second period is greater than a priority of the channel sounding information sent by using the first period. Therefore, if the UE needs to send the channel sounding information by using the first period and the second period as a sending period separately at a same moment, the UE switches to send the channel sounding information corresponding to the second period at the moment by using the second period as a sending period.

An example is used for detailed description. It is assumed that the first period is 3 ms, and the second period is 2 ms. Timing is started from the $0^{th}$ ms, the UE sends channel sounding information once at a multiple of 2 ms, and the UE sends channel sounding information once at a multiple of 3 ms. At the $6^{th}$ millisecond, the UE needs to send the channel sounding information by using the multiple of 2 ms. In addition, at the $6^{th}$ millisecond, the UE further needs to send the channel sounding information by using the multiple of 3 ms. In this case, the priority of the channel sounding information sent by using the second period is greater than the priority of the channel sounding information sent by using the first period, and the UE switches to send the channel sounding information by using the multiple of 2 ms. For the case in which at the 6$^{th}$ millisecond, the UE needs to send the channel sounding information by using the multiple of 3 ms, the UE may stop sending the channel sounding information by using the multiple of 3 ms, or the UE delays sending the channel sounding information by using the multiple of 3 ms.

The priority of the channel sounding information sent by using the second period is greater than the priority of the channel sounding information sent by using the first period. During specific implementation, in one manner, the priority may be determined based on accuracy of the channel sounding information sent in the two periods. For example, accuracy of the channel sounding information sent in the second period is greater than accuracy of the channel sounding information sent in the first period. The example in which the first period is 3 ms and the second period is 2 ms is still used. At the 6$^{th}$ millisecond, the priority of the channel sounding information sent by using the second period is greater than the priority of the channel sounding information sent by using the first period, and the UE may stop sending the channel sounding information by using the multiple of 3 ms. In this way, more accurate channel sounding information can be reported. During specific implementation, in another manner, the priority may be determined based on comprehensiveness of the channel sounding information. For example, when the channel sounding information is SRS information, wider bandwidth of fed back SRS information indicates a higher priority of a corresponding period of sending the SRS information.

In the foregoing method procedure, the UE periodically sends the channel sounding information by using the first period and/or the second period as a sending period. During specific implementation, the UE determines indication information in the received preset DCI. The indication information is used to indicate the first period and/or the second period. When the indication information is information used to start the first period and/or the second period, the UE periodically sends the channel sounding information by using the first period and/or the second period as a sending period.

The method may further include:

when the indication information is used to disable feedback of the channel sounding information, and the UE uses the second period as a sending period, restoring, by the UE, to periodically send the channel sounding information by using the first period as a sending period.

The method may further include:

when the indication information is used to disable feedback of the channel sounding information, and the UE uses the first period as a sending period, stopping, by the UE, sending the channel sounding information by using the first period as a sending period.

In the technical solution provided in Embodiment 1 of the present disclosure, the indication information is carried by using a field in the preset DCI, and the field in the preset DCI includes at least one of the following:

A: a downlink assignment index DAI field of the DCI;

B: a resource block assignment field in DCI format 1A control signaling, where if the preset DCI is the resource block assignment field in the DCI format 1A control signaling, and a value in the resource block assignment field is a specified value, designated location information in an MCS field in the DCI format 1A control signaling is obtained, and the designated location information is used as the indication information; and C: a CSI request field and an SRS request field in a DCI format 0 and/or the DCI format 4.

If the preset DCI is the CSI request field and the SRS request field in the DCI format 0 and/or the DCI format 4, the UE triggers aperiodic channel sounding information once. After sending the aperiodic channel sounding information, the UE periodically sends the channel sounding information by using the first period and/or the second period as a sending period. In the technical solution provided in Embodiment 1 of the present disclosure, for a case of aperiodic feedback of the channel sounding information, trigger binding of periodic feedback and the aperiodic feedback may be configured by using higher layer signaling. Through configuration by using the higher layer signaling, when receiving an aperiodic trigger instruction, the UE may report the channel sounding information in an aperiodic feedback manner. If this binding manner is not configured in the higher layer signaling, after receiving an SCI/SRS request, the UE does not feed back periodic channel sounding information.

In the technical solution provided in Embodiment 1 of the present disclosure, a plurality of different periodic feedback parameters, such as the first period and the second period, of the channel sounding information are configured through configuration on an RRC layer, to define LTE communication.

Figure 3:
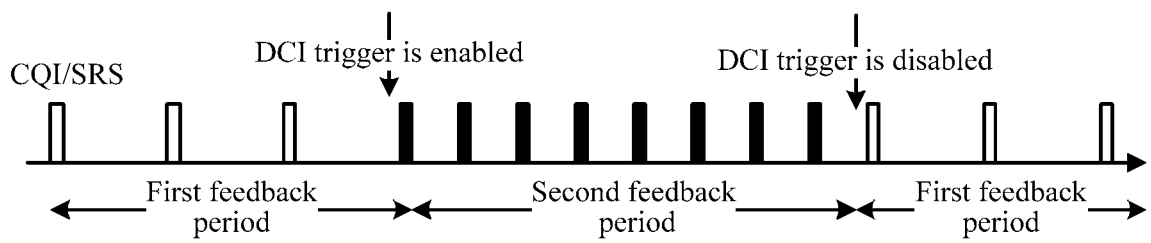
FIG. 3 is a schematic diagram of indicating periodic feedback by using DCI according to Embodiment 1 of the present disclosure.

Physical layer downlink transmission control signaling in a system is used to instruct, by using transmission of the downlink transmission control signaling on a physical layer, the UE to dynamically switch the sending period of the channel sounding information, to implement functions such as enabling, acceleration, reduction, interrupt, and disabling of periodic feedback of the channel sounding information, as shown in FIG. 3. If feedback frequency of the second period is higher than feedback frequency of the first period, an effect of accelerating feedback of the channel sounding information by the UE is presented. Otherwise, if the feedback frequency of the second period is lower than the feedback frequency of the first period, a feedback effect of reducing feedback of the channel sounding information by the UE is presented. When a period of the second period is defined as 0, that is, no information is fed back, an interrupt effect of periodic feedback is achieved. If a current second period is interspersed within a periodic feedback interval of the first period, effects such as enabling and disabling are presented, so that system overheads can be reduced, a configuration response can be improved, and spectrum utilization of the system can be improved while periodic feedback of indication is reduced.

Embodiment 2

Figure 4:
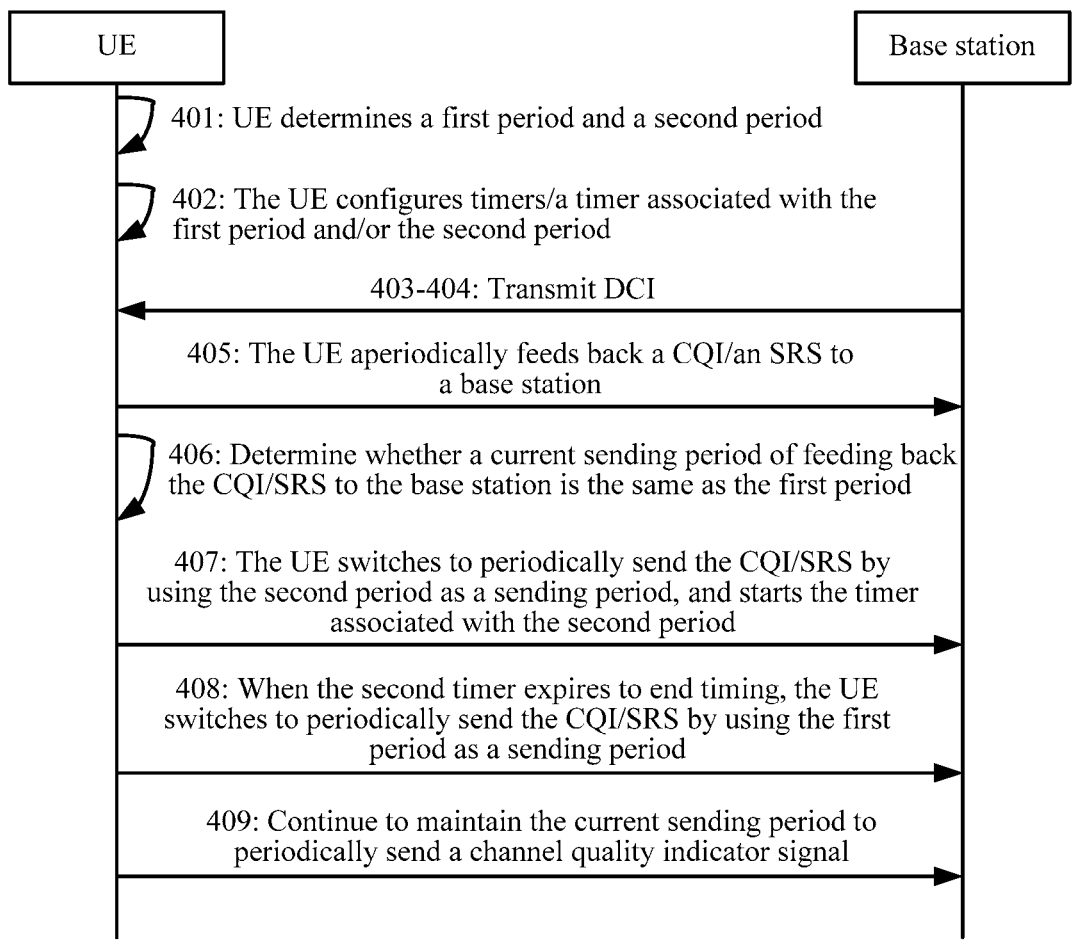
FIG. 4 is a flowchart of a channel sounding information feedback method according to Embodiment 2 of the present disclosure.

In a technical solution provided in Embodiment 2 of the present disclosure, a channel sounding information feedback method is further described by using an example in which channel sounding information is a CQI or an SRS. As shown in FIG. 4, a specific processing procedure of the method is as follows:

401: UE determines a first period and a second period that are of a report period used to periodically send a CQI/an SRS.

For a specific implementation process of 401, refer to the detailed descriptions of 101 in Embodiment 1, and details are not described in Embodiment 2 of the present disclosure again.

402: The UE configures timers/a timer associated with the first period and/or the second period.

In 402, the UE configures a first timer based on received system information that is sent by a base station, and the first timer is associated with the first period; and/or the UE configures a second timer based on the received system information that is sent by the base station, and the second timer is associated with the second period.

In the technical solution provided in Embodiment 2 of the present disclosure, an example in which the UE configures the second timer based on the received system information that is sent by the base station and the second timer is associated with the second period is used for detailed description. Specifically, an implementation of the first timer associated with the first period is the same as an implementation of the second timer associated with the second period, and details are not described.

When the UE periodically feeds back the CQI/SRS to the base station by using the second period as a sending period, the associated second timer is started to start timing until the timing of the second timer ends. During this time, any trigger to the second timer cannot turn off or re-start the timer.

403: A base station sends preset DCI to the UE.

The base station sends the preset DCI to the UE, to trigger the UE to aperiodically send the CQI/SRS.

404: The UE receives the preset DCI.

405: The UE aperiodically feeds back the CQI/SRS to the base station.

406: The UE determines whether a current sending period of feeding back the CQI/SRS to the base station is the same as the first period, and if the current sending period is the same as the first period, performs 407, or if the current sending period is different from the first period, performs 409.

407: The UE switches to periodically send the CQI/SRS by using the second period as a sending period, and starts a second timer associated with the second period.

408: When the second timer expires to end timing, the UE switches to periodically send the CQI/SRS by using the first period as a sending period.

409: The UE continues to maintain the current sending period to periodically send the CQI/SRS.

In the foregoing method procedure, the second timer associated with the second period is used as an example for detailed description. During specific implementation, for the first timer associated with the first period, during specific implementation, that the UE periodically sends the channel sounding information by using the first period as a sending period includes: starting, by the UE, the first timer, and when the first timer expires, stopping, by the UE, periodically sending the channel sounding information by using the first period as a sending period.

In the technical solution provided in Embodiment 2 of the present disclosure, the first period, the second period, the first timer associated with the first period, and the second timer associated with the second period are set, so that when the UE switches to send the CQI/SRS by using the second period as a sending period, the UE does not automatically switch to send the CQI/SRS by using the first period as a sending period, until the timing of the second timer associated with the second period ends, thereby triggering short periodic feedback of the CQI/SRS.

In the technical solution provided in Embodiment 2 of the present disclosure, a part in a specific implementation of sending the CQI/SRS by the UE by using the first period as a sending period same as that in the specific implementation of sending the CQI/SRS by the UE by using the second period as a sending period is not described again, only the example in which the UE is triggered to send the CQI/SRS by using the second period as a sending period is used for description.

Embodiment 3

Figure 5:
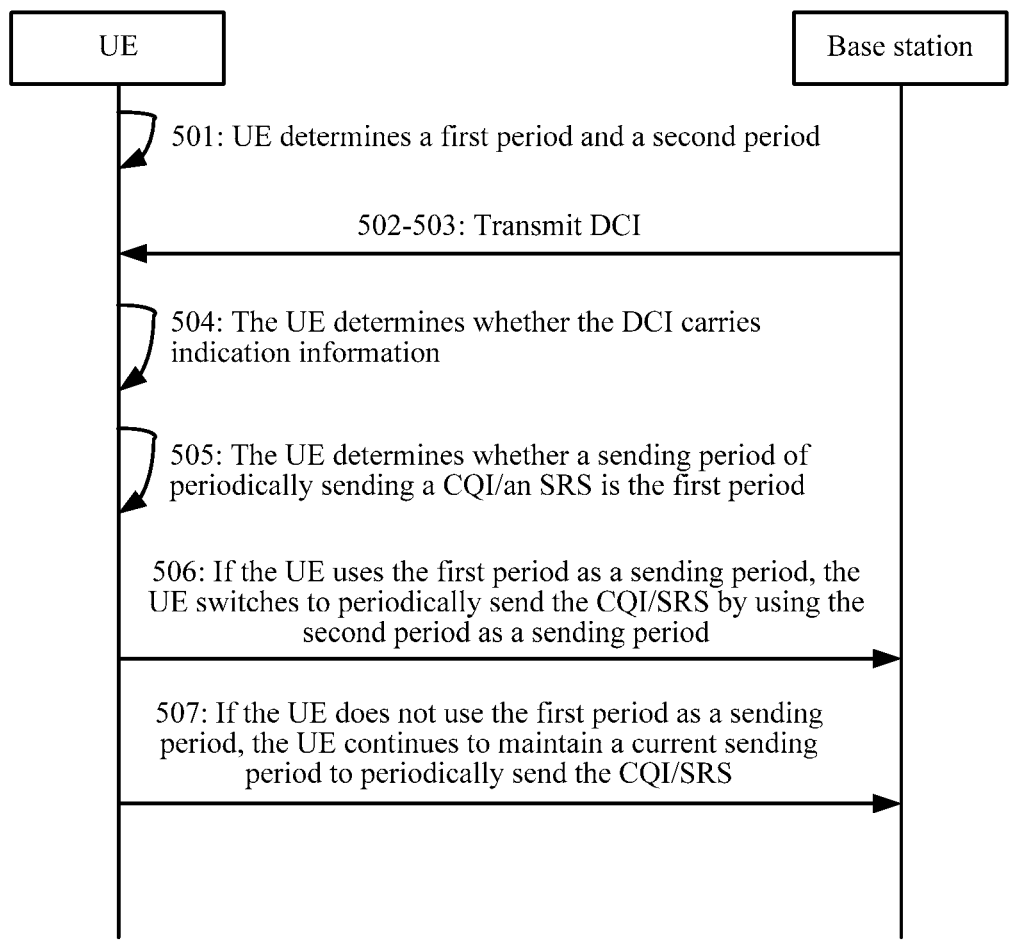
FIG. 5 is a flowchart of a channel sounding information feedback method according to Embodiment 3 of the present disclosure.

In a technical solution provided in Embodiment 3 of the present disclosure, a channel sounding information feedback method is further described by using an example in which channel sounding information is a CQI or an SRS. As shown in FIG. 5, a specific processing procedure of the method is as follows:

501: UE determines a first period and a second period that are of a report period used to periodically send a CQI/an SRS.

For a specific implementation process of 501, refer to the detailed descriptions of 101 and 101' in Embodiment 1, and details are not described in Embodiment 3 of the present disclosure again.

502: A base station sends preset DCI to the UE.

The base station sends the preset DCI to the UE, to trigger the UE to aperiodically send the CQI/SRS.

An example in which the preset DCI may be a downlink assignment index (DAI) field of the DCI is used for detailed description. The base station may instruct, by using a downlink assignment index field of DCI in downlink non-common reference signaling, the UE to periodically send the CQI/SRS by using the second period as a sending period.

It is stipulated in a standard that a DAI location of DCI is used to indicate bundled feedback acknowledgement/negative acknowledgement (ACK/NACK) information. During specific implementation of this step, when the ACK/NACK is not used, the base station may add, to the DAI location of the DCI, indication information used to indicate the second period.

For example, 1-bit information in the DAI field may be extracted as indication signaling for enabling or disabling the UE to periodically send the CQI/SRS by using the second period as a sending period. Specifically, DAI field indication signaling shown in the following Table 3 is used as an example.

TABLE 3

| DAI field information | Status |
|---|---|
| 0 | Enable |
| 1 | Disable |

503: The UE receives the preset DCI sent by the base station.

504: The UE determines whether the DCI carries indication information for enabling or disabling the UE to periodically send the CQI/SRS by using the second period as a sending period, and if a determining result is yes, performs 505, or if a determining result is no, skips processing.

The UE receives the DCI sent by the base station. If detecting that the bundled ACK/NACK is not currently used in the received DCI, the UE determines that the DAI field in the DCI carries the indication signaling for enabling or disabling the UE to periodically send the CQI/SRS by using the second period as a sending period.

505: The UE determines whether a sending period of periodically sending the CQI/SRS is the first period, and if a determining result is yes, performs 506, or if a determining result is no, performs 507.

506: If the UE uses the first period as a sending period, the UE switches to periodically send the CQI/SRS by using the second period as a sending period.

507: If the UE does not use the first period as a sending period, the UE continues to maintain a current sending period to periodically send the CQI/SRS.

In 505 to 507, if the UE detects that the bundled feedback ACK/NACK is not currently used in DCI that is received on a downlink control channel, it indicates that the DAI currently carries a trigger instruction for periodically sending the CQI/SRS. In this case, if received DAI field information is detected as 0, the UE stops sending the CQI/SRS to the base station by using the first period as a sending period, and switches to send the CQI/SRS to the base station by using the second period as a sending period. If the received DAI field information is detected as 1, the UE stops periodically sending the CQI/SRS to the base station by using the second period as a sending period currently, and restores to periodically send the CQI/SRS to the base station by using the first period as a sending period.

In the technical solution provided in Embodiment 3, the information carried in the DAI field of the DCI is defined, to instruct the UE to dynamically switch a sending period of the channel sounding information.

Embodiment 4

Figure 6:
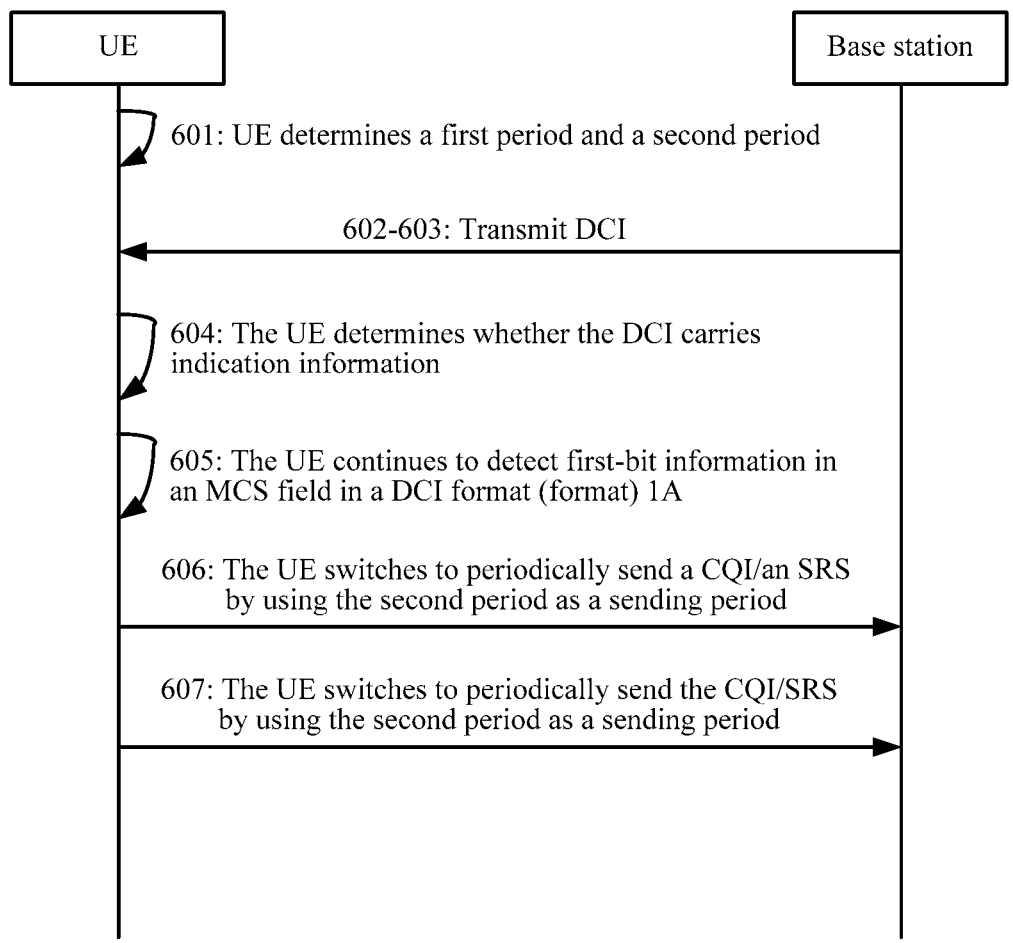
FIG. 6 is a flowchart of a channel sounding information feedback method according to Embodiment 4 of the present disclosure.

In a technical solution provided in Embodiment 4 of the present disclosure, a channel sounding information feedback method is further described by using an example in which channel sounding information is a CQI or an SRS. As shown in FIG. 6, a specific processing procedure of the method is as follows:

601: UE determines a first period and a second period that are of a report period used to periodically send a CQI/an SRS.

For a specific implementation process of 601, refer to the detailed descriptions of 101 in Embodiment 1, and details are not described in Embodiment 4 of the present disclosure again.

602: A base station sends preset DCI to the UE.

The base station sends the preset DCI to the UE, to trigger the UE to aperiodically send the CQI/SRS.

The base station may instruct, by using DCI format 1A control signaling, the UE to periodically send the CQI/SRS by using the second period as a sending period.

For example, the base station may instruct, by using the DCI format 1A control signaling, to enable or disable the UE to periodically send the CQI/SRS by using the second period as a sending period. Unused information in a resource block assignment field in a DCI format 1A is stipulated, for example, is all configured to 0 or 1, to indicate to the UE that the current control signaling is to instruct to enable/disable the UE to periodically send the CQI/SRS by using the second period as a sending period.

In the technical solution provided in Embodiment 4 of the present disclosure, the format 1A control signaling has sufficient information bits. 1-bit information in any field may be extracted for indication. For example, as shown in Table 4, 1-bit information in an MCS field in the format 1A is extracted for indication.

TABLE 4

| First bit in the MCS field | Status |
| --- | --- |
| 0 | Enable |
| 1 | Disable |

603: The UE receives the DCI sent by the base station.

604: The UE determines whether the DCI carries indication signaling for enabling or disabling the UE to periodically send the CQI/SRS by using the second period as a sending period, and if a determining result is yes, performs 605, or if a determining result is no, skips processing.

For example, if detecting that information in a resource block assignment field in a DCI format 1A received on a downlink control channel is all 0, the UE determines that the information is the indication signaling for enabling or disabling the UE to periodically send the CQI/SRS by using the second period as a sending period.

Alternatively, the information in the resource block assignment field may all be 1, used as the indication signaling for enabling or disabling the UE to periodically send the CQI/SRS by using the second period as a sending period.

605: The UE continues to detect first-bit information in an MCS field in a DCI format 1A.

606: If received first-bit information in the MCS field is 0, the UE stops using the first period as a sending period, and switches to periodically send the CQI/SRS by using the second period as a sending period.

607: If received first-bit information in the MCS field is 1, the UE stops using the second period as a sending period, and switches to periodically send the CQI/SRS by using the first period as a sending period.

In the technical solution provided in Embodiment 4 of the present disclosure, the information carried in a DAI field of the DCI is defined, to instruct the UE to dynamically switch a sending period of the channel sounding information.

Embodiment 5

In the foregoing Embodiment 2 to Embodiment 4, the specific implementation procedure of the channel sounding information feedback method is described by using an example in which channel sounding information is a CQI or an SRS. In a technical solution provided in Embodiment 5 of the present disclosure, a channel sounding information feedback method is described in detail by using an example in which channel sounding information is a CQI and an SRS, that is, UE reports both the CQI and the SRS. A specific processing procedure of the method is as follows:

First, UE determines a first period and a second period that are of a report period used to periodically send a CQI and an SRS.

For a specific implementation process of the first step, refer to the detailed descriptions of 101 in Embodiment 1, and details are not described in Embodiment 5 of the present disclosure again.

Second, the UE configures a timer associated with the second period.

In the second step, the UE configures the timer based on received system information that is sent by a base station, and the timer is associated with the second period.

When the UE periodically feeds back the CQI and the SRS to the base station by using the second period as a sending period, the timer is started to start timing until the timing of the second timer ends. During this time, any trigger to the timer cannot turn off or re-start the timer.

Third, a base station sends DCI to the UE.

The base station sends the DCI to the UE, to trigger the UE to aperiodically send the CQI and the SRS.

The base station may instruct, by using a CQI request field and an SRS request field in a DCI format 0 and/or a DCI format 4 separately, the UE to periodically send the CQI and the SRS by using the second period as a sending period.

For example, in an implementation, the UE may instruct, by using the CQI request field and the SRS request field that are configured in the DCI format 0, the UE to periodically report the CQI and the SRS by using the second period as a sending period.

In an implementation, the UE may instruct, by using the CQI request field and the SRS request field that are configured in the DCI format 4, the UE to periodically report the CQI and the SRS by using the second period as a sending period.

In an implementation, the UE may instruct, by using the CQI request field configured in the DCI format 0 and the SRS request field configured in the DCI format 4, the UE to periodically report the CQI and the SRS by using the second period as a sending period.

In an implementation, the UE may instruct, by using the CQI request field configured in the DCI format 4 and the SRS request field configured in the DCI format 0, the UE to periodically report the CQI and the SRS by using the second period as a sending period.

Fourth, the UE receives the DCI.

405: The UE aperiodically feeds back the CQI and the SRS to the base station.

Sixth, the UE determines whether a current sending period of feeding back the CQI and the SRS to the base station is the same as the first period, and if the current sending period is the same as the first period, performs the sixth step, or if the current sending period is different from the first period, performs the ninth step.

Seventh, the UE switches to periodically send the CQI and the SRS by using the second period as a sending period, and starts the timer associated with the second period.

Eighth, when the timer expires to end timing, the UE switches to periodically send the CQI and the SRS by using the first period as a sending period.

Ninth, the UE continues to maintain the current sending period to periodically send the CQI and the SRS.

In the technical solution provided in Embodiment 5 of the present disclosure, the first period, the second period, and the timer associated with the second period are set, so that when the UE switches to send the CQI/SRS by using the second period as a sending period, the UE does not automatically switch to send the CQI and the SRS by using the first period as a sending period, until the timing of the timer associated with the second period ends, thereby triggering short periodic feedback of the CQI and the SRS.

Embodiment 6

In a technical solution provided in Embodiment 6 of the present disclosure, a channel sounding information feedback method is further described by using an example in which channel sounding information is a CQI and an SRS. A specific processing procedure of the method is as follows:

First, UE determines a first period and a second period that are of a report period used to periodically send a CQI and an SRS.

For a specific implementation process of the first step, refer to the detailed descriptions of 101 in Embodiment 1, and details are not described in Embodiment 6 of the present disclosure again.

Second, a base station sends DCI to the UE.

The base station sends the DCI to the UE, to trigger the UE to aperiodically send the CQI and the SRS.

The base station may instruct, by using a downlink assignment index (DAI) field of DCI in downlink non-common reference signaling, the UE to periodically send the CQI/SRS by using the second period as a sending period. When the DAI of the DCI carries a bundled feedback acknowledgement/negative acknowledgement (ACK/NACK), the base station adds indication information used to indicate the second period to the DAI field.

For example, 2-bit information in the DAI field may be extracted as indication signaling for enabling or disabling the UE to periodically send the CQI and the SRS by using the second period as a sending period. Specifically, DAI field indication signaling shown in the following Table 5 is used as an example.

TABLE 5

| DAI field information | Status |
| --- | --- |
| 00 | Enable the CQI, and enable the SRS |
| 01 | Enable the CQI, and disable the SRS |
| 10 | Disable the CQI, and enable the SRS |
| 11 | Disable the CQI, and disable the SRS |

Third, the UE receives the DCI sent by the base station.

Fourth, the UE determines whether the DCI carries indication signaling for enabling or disabling the UE to periodically send the CQI and the SRS by using the second period as a sending period, and if a determining result is yes, performs the fifth step, or if a determining result is no, skips processing.

The UE receives the DCI sent by the base station. If detecting that the bundled ACK/NACK is not currently used in the received DCI, the UE determines that the DAI field in the DCI carries the indication signaling for enabling or disabling the UE to periodically send the CQI and the SRS by using the second period as a sending period.

Fifth, the UE determines whether a sending period of periodically sending the CQI and the SRS is the first period, and if a determining result is yes, performs the sixth step, or if a determining result is no, performs the seventh step.

Sixth, if the UE uses the first period as a sending period, the UE switches to periodically send the CQI and the SRS by using the second period as a sending period.

Seventh, if the UE does not use the first period as a sending period, the UE continues to maintain a current sending period to periodically send the CQI and the SRS.

In the fifth to the seventh steps, if the UE detects that the bundled feedback ACK/NACK is not currently used in DCI that is received on a downlink control channel, it indicates that the DAI currently carries a trigger instruction for periodically sending the CQI and the SRS. In this case, if received DAI field information is detected as 0, the UE stops sending the CQI and the SRS to the base station by using the first period as a sending period, and switches to send the CQI and the SRS to the base station by using the second period as a sending period. If the received DAI field information is detected as 1, the UE stops periodically sending the CQI and the SRS to the base station by using the second period as a sending period currently, and restores to periodically send the CQI and the SRS to the base station by using the first period as a sending period. Further, the UE may determine, based on the information carried in the DAI field, whether to periodically send the CQI and the SRS simultaneously by using the second period as a sending period, or to periodically send the CQI and the SRS separately by using the second period as a sending period.

In the technical solution provided in Embodiment 6, the information carried in the DAI field of the DCI is defined, to instruct the UE to dynamically switch a sending period of the channel sounding information.

Embodiment 7

In a technical solution provided in Embodiment 7 of the present disclosure, a channel sounding information feedback method is further described by using an example in which channel sounding information is a CQI and an SRS. A specific processing procedure of the method is as follows:

First, UE determines a first period and a second period that are of a report period used to periodically send a CQI/an SRS.

For a specific implementation process of the first step, refer to the detailed descriptions of 101 in Embodiment 1, and details are not described in Embodiment 7 of the present disclosure again.

Second, a base station sends DCI to the UE.

The base station sends the DCI to the UE, to trigger the UE to aperiodically send the CQI/SRS.

The base station may instruct, by using DCI format 1A control signaling, the UE to periodically send the CQI and the SRS by using the second period as a sending period.

For example, the base station may instruct, by using the DCI format 1A control signaling, to enable or disable the UE to periodically send the CQI and the SRS by using the second period as a sending period. Unused information in a resource block assignment field in a DCI format 1A is stipulated, for example, is all configured to 0 or 1, to indicate to the UE that the current control signaling is to instruct to enable/disable the UE to periodically send the CQI and the SRS by using the second period as a sending period. In the technical solution provided in Embodiment 7 of the present disclosure, the format 1A control signaling has sufficient information bits. 2-bit information in any field may be extracted for indication. For example, as shown in Table 4, 2-bit information in an MCS field in the format 1A is extracted for indication.

TABLE 6

| First two bits in the MCS field | Status |
| --- | --- |
| 00 | Enable the CQI, and enable the SRS |
| 01 | Enable the CQI, and disable the SRS |
| 10 | Disable the CQI, and enable the SRS |
| 11 | Disable the CQI, and disable the SRS |

Third, the UE receives the DCI sent by the base station.

Fourth, the UE determines whether the DCI carries indication signaling for enabling or disabling the UE to periodically send the CQI and the SRS by using the second period as a sending period, and if a determining result is yes, performs the fifth step, or if a determining result is no, skips processing.

For example, if detecting that information in a resource block assignment field in a DCI format 1A received on a downlink control channel is all 0, the UE determines that the information is the indication signaling for enabling or disabling the UE to periodically send the CQI and the SRS by using the second period as a sending period.

Alternatively, the information in the resource block assignment field may all be 1, used as the indication signaling for enabling or disabling the UE to periodically send the CQI/SRS by using the second period as a sending period.

Fifth, the UE continues to detect first-bit information in an MCS field in the DCI format 1A.

Sixth, if received first-bit information in the MCS field is 0, the UE stops using the first period as a sending period, and switches to periodically send the CQI/SRS by using the second period as a sending period.

Seventh, if received first-bit information in the MCS field is 1, the UE stops using the second period as a sending period, and switches to periodically send the CQI/SRS by using the first period as a sending period.

In the technical solution provided in Embodiment 7 of the present disclosure, the information carried in the DAI field of the DCI is defined, to instruct the UE to dynamically switch a sending period of the channel sounding information.

Embodiment 8

Figure 7:
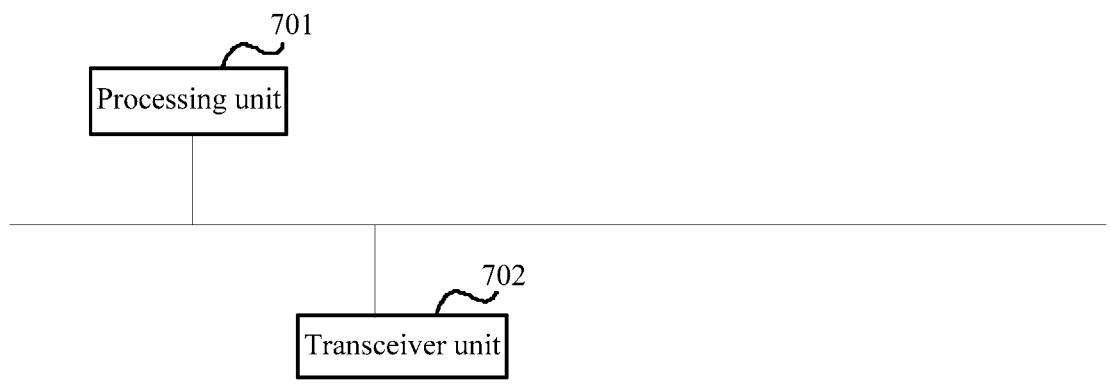
FIG. 7 is a schematic diagram of structural components of user equipment according to Embodiment 8 of the present disclosure.

Embodiment 8 of the present disclosure provides user equipment. As shown in FIG. 7, the user equipment includes a processing unit 701 and a transceiver unit 702.

The processing unit 701 is configured to determine a first period used to periodically report channel sounding information.

The transceiver unit 702 is configured to receive preset downlink control information DCI that is sent by a base station.

The processing unit 701 is further configured to periodically send, by using the transceiver unit 702 and by the UE based on the received preset downlink control information DCI that is sent by the base station, the channel sounding information by using the first period as a sending period.

Optionally, the processing unit 701 is further configured to: determine a second period used to periodically report channel sounding information; and periodically send, by using the transceiver unit, the channel sounding information by using the first period and/or the second period as a sending period.

Optionally, the processing unit 701 is further configured to: before the preset DCI is received, periodically send, by using the transceiver unit, the channel sounding information by using the first period as a sending period; and after the preset DCI is received, switch to periodically send the channel sounding information by using the second period as a sending period.

A priority of the channel sounding information sent by using the second period is greater than a priority of the channel sounding information sent by using the first period. The processing unit 701 is specifically configured to: if the UE needs to send the channel sounding information by using the first period and the second period as a sending period separately at a same moment, switch, by the UE, to send the channel sounding information corresponding to the second period at the moment by using the second period as a sending period.

Specifically, the processing unit 701 is configured to configure a first timer associated with the first period and/or a timer associated with the second period.

Specifically, the processing unit 701 is specifically configured to: start the second timer; and when the second timer expires, stop periodically sending the channel sounding information by using the second period as a sending period, and restore to periodically send the channel sounding information by using the first period as a sending period.

Specifically, the processing unit 701 is specifically configured to: start the first timer; and when the first timer expires, stop periodically sending the channel sounding information by using the first period as a sending period.

Specifically, the processing unit 701 is specifically configured to: determine indication information in the received preset DCI, where the indication information is used to indicate the first period and/or the second period; and when the indication information is information used to start the first period and/or the second period, periodically send the channel sounding information by using the first period and/or the second period as a sending period.

Specifically, the processing unit 701 is specifically configured to: when the indication information is used to disable feedback of the channel sounding information, and the UE uses the second period as a sending period, restore to periodically send the channel sounding information by using the first period as a sending period.

Specifically, the processing unit 701 is further configured to: when the indication information is used to disable feedback of the channel sounding information, and the UE uses the first period as a sending period, stop sending the channel sounding information by using the first period as a sending period.

The preset DCI received by the transceiver unit includes at least one of the following: a downlink assignment index DAI field of the DCI, a resource block assignment Resource block assignment field in the DCI format Format 1A control signaling, and a CSI request field and an SRS request field in the DCI format 0 and/or the DCI format 4.

Specifically, the processing unit 701 is specifically configured to: if the preset DCI is the resource block assignment field in the DCI format 1A control signaling, and a value in the resource block assignment field is a specified value, obtain designated location information in a modulation and coding scheme MCS field in the DCI format 1A control signaling; and use the designated location information as the indication information.

Specifically, the processing unit 701 is specifically configured to: if the preset DCI is the CSI request field and the SRS request field in the DCI format 0 and/or the DCI format 4, trigger, by the UE, aperiodic channel sounding information once; and after the aperiodic channel sounding information is sent, periodically send, by the UE, the channel sounding information by using the first period and/or the second period as a sending period.

Specifically, the channel sounding information sent by the processing unit 701 by using the transceiver unit includes a channel sounding information indicator CQI and/or a channel sounding reference signal SRS.

Correspondingly, an embodiment of the present disclosure further provides user equipment, including a transceiver and a processor. For specific implementation of the transceiver, refer to the detailed descriptions of the foregoing transceiver unit, and details are not described herein again. The transceiver may include an interface. The interface may be one or more of the following: a network interface controller (NIC for short) provided with a wired interface, such as an Ethernet NIC, where the Ethernet NIC can provide a copper-wired and/or fiber interface; and a NIC provided with a wireless interface, such as a wireless local area network (WLAN for short) NIC.

The user equipment may further include a memory, configured to store data and program code. The memory may be a volatile memory such as a random access memory (RAM for short); or a nonvolatile memory such as a flash memory, a hard disk drive (HDD for short), or a solid-state drive (SSD for short); or a combination of such types of memories.

For specific implementation of the processor, refer to the detailed descriptions of the foregoing processing unit, and details are not described herein again. The processor may be a central processing unit (CPU for short), or a combination of a CPU and a hardware chip. A signal processing unit may also be a network processing unit (NP for short), a combination of a CPU and an NP, or a combination of an NP and a hardware chip.

The hardware chip may be one or a combination of the following: an application-specific integrated circuit (ASIC for short), a field-programmable gate array (FPGA for short), and a complex programmable logic device (CPLD for short).

Figure 8:
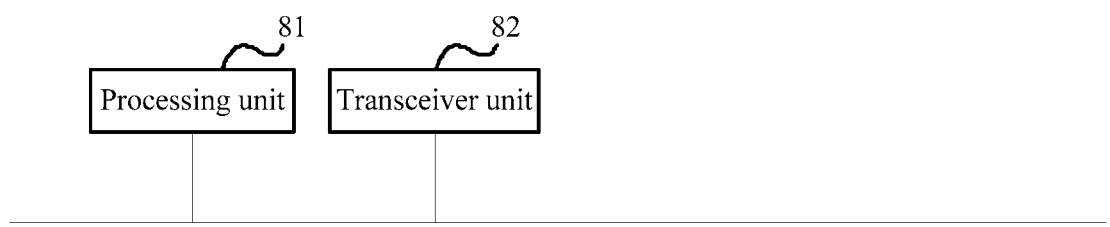
FIG. 8 is a schematic diagram of structural components of a base station according to Embodiment 9 of the present disclosure.

Correspondingly, Embodiment 9 of the present disclosure further provides a base station. As shown in FIG. 8, the base station includes a processing unit 81 and a transceiver unit 82.

The processing unit 81 is configured to: preset downlink control information DCI; send the preset downlink control information DCI to user equipment UE by using the transceiver unit 82; and receive channel sounding information sent by the UE, where the channel sounding information is periodically sent by the UE by using a first period and/or a second period as a sending period, and the first period and the second period are a sending period used by the UE to send the channel sounding information.

Specifically, the processing unit 81 is specifically configured to send the preset DCI to the UE by using the transceiver unit 82, where the preset DCI includes indication information, and the indication information is used to indicate the first period and/or the second period.

Specifically, the indication information sent by the transceiver unit 82 includes one of the following: information used to start the first period and/or the at least one second period; and information used to end the first period and/or the at least one second period.

The preset DCI includes a downlink assignment index DAI field of the DCI. Specifically, the processing unit 81 is specifically configured to send the preset DCI to the UE, where when the DAI field of the DCI does not carry a bundled feedback acknowledgement/negative acknowledgement ACK/NACK, the base station sets the DAI field to carry the indication information used to indicate feedback of the channel sounding information.

The preset DCI includes a resource block assignment Resource block assignment field in the DCI format Format 1A control signaling. The processing unit 81 is specifically configured to: set a value in the resource block assignment field in the DCI format 1A control signaling to a specified value; set designated bit information in a modulation and coding scheme MCS field in the DCI format 1A control signaling, where the specified value and the designated bit information are used to indicate the indication information for indicating the first period and/or the second period; and send the DCI format 1A control signaling carrying the indication information to the UE.

The preset DCI includes a CSI request field and an SRS request field in a DCI format 0 and/or the DCI format 4. The processing unit 81 is specifically configured to: set the CSI request field and the SRS request field in the DCI format 0 and/or the DCI format 4 control signaling to a specified value, where the specified value is the indication information for indicating the first period and/or the second period;

and send the DCI format 0 and/or DCI format 4 control signaling carrying the indication information to the UE.

Specifically, the channel sounding information received by the transceiver unit 82 includes a channel sounding information indicator CQI and/or a channel sounding reference signal SRS.

In the base station provided in this embodiment of the present disclosure, the transceiver unit 82 may be implemented by using a transceiver, the transceiver includes an interface, and the interface may be one or more of the following: a NIC provided with a wired interface, such as an Ethernet NIC, where the Ethernet NIC may provide a copper-wired and/or fiber interface; and a NIC provided with a wireless interface, such as a WLAN NIC.

The base station provided in this embodiment of the present disclosure may further include a memory, configured to store data and program code.

The memory may be a volatile memory such as a RAM; or a non-volatile memory such as a flash memory, an HDD, or an SSD; or a combination of such types of memories.

For specific implementation of the processor, refer to the detailed descriptions of the foregoing processing unit, and details are not described herein again.

The processor may be a CPU or a combination of a CPU and a hardware chip; or may be an NP or a combination of a CPU and an NP; or a combination of an NP and a hardware chip.

The hardware chip may be one or a combination of the following: an ASIC, an FPGA, and a CPLD.

A person skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read-only memory, an optical memory, and the like) that include computer-usable program code.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a specific-purpose computer, an embedded processor, or any other programmable data processing device to generate a machine, so that the instructions executed by a computer or any other programmable data processing device generate an apparatus for implementing a specific function in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, a person skilled in the art can make changes and modifications to these embodiments once they learn the basic inventive concept. Therefore, the following claims are intended to be construed as covering the preferred embodiments and all changes and modifications falling within the scope of the present disclosure.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method, comprising:
   determining, by user equipment (UE), a first period used to periodically send first channel sounding information;
   receiving, by the UE, first indication information carried by downlink control information (DCI) sent by a base station;
   periodically sending, by the UE, according to the first indication information, the first channel sounding information by using the first period as a sending period;
   sending, by the UE, second channel sounding information by using a second period, wherein the second channel sounding information is different from the first channel sounding information; and
   when the first period and the second period overlaps, switching, by the UE, to send the second channel sounding information using the second period and not to send the first channel sounding information using the first period, wherein
   a priority of the channel sounding information sent by using the second period is greater than a priority of the channel sounding information sent by using the first period.

2. The method according to claim 1, wherein:
   the first indication information is used to indicate the UE to switch to periodically send the second channel sounding information by using the second period as a sending period; or
   the first indication information is used to indicate the UE to periodically send the first channel sounding information by using the first period as a sending period, and/or to periodically send the second channel sounding information by using the second period as a sending period.

3. The method according to claim 1, further comprising:
   receiving, by the UE, second indication information sent by the base station;
   when the second indication information is used to disable reporting of channel sounding information, and the UE uses the first period as a sending period to periodically send the first channel sounding information, stopping, by the UE, sending the first channel sounding information by using the first period as a sending period.

4. The method according to claim 1, wherein the indication information is carried by using a field in the DCI; and the field in the DCI comprises at least one of the following:
- a resource block assignment field in the DCI; and
- a designated location information in the modulation and coding scheme (MCS) field in the DCI, and a value in a resource block assignment field in the DCI is a specified value.

5. The method according to claim 1, wherein the first channel sounding information comprises a channel quality information indicator (CQI) and/or a channel sounding reference signal (SRS).

6. An apparatus, comprising:
- one or more processors;
- a non-transitory memory for storing computer instructions that when executed by the one or more processors cause the apparatus to perform:
- determining a first period used to periodically send first channel sounding information;
- receiving first indication information carried by downlink control information (DCI) sent by a base station; and
- periodically sending, according to the first indication information, the first channel sounding information by using the first period as a sending period;
- sending second channel sounding information by using a second period; and the second channel sounding information is different from the first channel sounding information; and
- when the first period and the second period overlaps, switching to send the second channel sounding information using the second period and not to send the first channel sounding information using the first period, wherein
- a priority of the channel sounding information sent by using the second period is greater than a priority of the channel sounding information sent by using the first period.

7. The apparatus according to claim 6, wherein:
- the first indication information is used to indicate the UE to switch to periodically send the second channel sounding information by using the second period as a sending period; or
- the first indication information is used to indicate the UE to periodically send the first channel sounding information by using the first period as a sending period, and/or to periodically send the second channel sounding information by using the second period as a sending period.

8. The apparatus according to claim 6, wherein the one or more processors are further caused to perform:
- receiving second indication information sent by the base station;
- when the second indication information is used to disable reporting of channel sounding information, and the UE uses the first period as a sending period to periodically send the first channel sounding information, stopping sending the first channel sounding information by using the first period as a sending period.

9. The apparatus according to claim 6, wherein the indication information is carried by using a field in the DCI; and the field in the DCI comprises at least one of the following:
- a resource block assignment field in the DCI; and
- a designated location information in the modulation and coding scheme (MCS) field in the DCI, and a value in a resource block assignment field in the DCI is a specified value.

10. The apparatus according to claim 6, wherein the first channel sounding information comprises a channel quality information indicator (CQI) and/or a channel sounding reference signal (SRS).

11. The apparatus according to claim 6, wherein the DCI is preset DCI.

12. An apparatus, comprising:
- one or more processors;
- a non-transitory memory for storing computer instructions that when executed by the one or more processors cause the apparatus to perform:
- sending first indication information to user equipment (UE), which is carried by downlink control information (DCI);
- receiving first channel sounding information periodically sent by the UE in a first period, wherein the first period is trigger by the first indication information; and
- receiving second channel sounding information periodically sent by UE in a second period, wherein the second channel sounding information is different from the first channel sounding information; wherein
- a priority of the channel sounding information sent by using the second period is greater than a priority of the channel sounding information sent by using the first period.

13. The apparatus according to claim 12, wherein:
- the first indication information is used to indicate the UE to switch to periodically send the second channel sounding information by using the second period as a sending period; or
- the first indication information is used to indicate the UE to periodically send the first channel sounding information by using the first period as a sending period, and/or to periodically send the second channel sounding information by using the second period as a sending period.

14. The apparatus according to claim 12, wherein the one or more processors are further caused to perform:
- sending second indication information to the UE, which is used to disable reporting of channel sounding information.

15. The apparatus according to claim 12, wherein the first indication information is carried by using a field in the DCI; and the field in the DCI comprises at least one of the following:
- a resource block assignment field in the DCI; and
- a designated location information in the modulation and coding scheme (MCS) field in the DCI, and a value in a resource block assignment field in the DCI is a specified value.

16. The apparatus according to claim 12, wherein the DCI is preset DCI.

17. The apparatus according to claim 12, wherein the first channel sounding information comprises a channel quality information indicator (CQI) and/or a channel sounding reference signal (SRS).

* * * * *